US008282692B2

(12) United States Patent
Nair et al.

(10) Patent No.: US 8,282,692 B2
(45) Date of Patent: Oct. 9, 2012

(54) BIOFUEL COMPOSITION, PROCESS OF PREPARATION AND A METHOD OF FUELING THEREOF

(75) Inventors: Chandrasekhar Bhaskaran Nair, Bangalore (IN); Pillarisetti Venkata Subbarao, Bangalore (IN); Phanikumar Pullela, Bangalore (IN); Gopalkrishna Mangalore Kini, Bangalore (IN)

(73) Assignee: Bigtec Private Limited, Bangalore (IN)

( * ) Notice: Subject to any disclaimer, the term of this patent is extended or adjusted under 35 U.S.C. 154(b) by 367 days.

(21) Appl. No.: 12/452,397

(22) PCT Filed: Jun. 26, 2008

(86) PCT No.: PCT/IN2008/000413
§ 371 (c)(1),
(2), (4) Date: Dec. 29, 2009

(87) PCT Pub. No.: WO2009/004652
PCT Pub. Date: Jan. 8, 2009

(65) Prior Publication Data
US 2010/0107475 A1    May 6, 2010

(30) Foreign Application Priority Data

Jun. 29, 2007  (IN) .................. 01396/CHE/2007
Dec. 6, 2007   (IN) .................. 02925/CHE/2007

(51) Int. Cl.
*C10L 1/00*   (2006.01)
*C10L 1/18*   (2006.01)

(52) U.S. Cl. ............ 44/307; 44/308; 44/376; 44/378; 44/382; 44/436; 44/442; 44/450

(58) Field of Classification Search ............ 44/307, 44/376, 378, 382, 436, 442, 450, 308
See application file for complete search history.

(56) References Cited

U.S. PATENT DOCUMENTS

| 2,230,995 A | 2/1941 | Balvalli |
| 2,559,594 A * | 7/1951 | Caplan ................... 562/475 |
| 6,797,021 B2 | 9/2004 | Puri et al. |
| 2005/0160661 A1 | 7/2005 | Tuli et al. |
| 2008/0034645 A1 | 2/2008 | Bressler |

FOREIGN PATENT DOCUMENTS

GB    587273 A    4/1947

OTHER PUBLICATIONS

International Search Report mailed on Nov. 21, 2008 in corresponding International Application No. PCT/IN2008/000413.
Das et al. "Bio oil from pyrolysis of cashew nut shell—characterisation and related properties." Biomass & Bioenergy 27 (2004), pp. 265-275.

* cited by examiner

*Primary Examiner* — Cephia D Toomer
(74) *Attorney, Agent, or Firm* — Oliff & Berridge, PLC

(57) ABSTRACT

The present invention relates to a biofuel composition comprising distilled technical cashew nut shell liquid (DT-CNSL) and atleast one petroleum product optionally alongwith plant oils and fuel additive(s). It also relates to a process for preparation of biofuel composition and a method of fueling biofuel composition.

38 Claims, No Drawings

BIOFUEL COMPOSITION, PROCESS OF PREPARATION AND A METHOD OF FUELING THEREOF

FIELD OF THE INVENTION

The present invention relates to Biofuel. It involves disclosure of distilled technical cashew nut shell liquid (CNSL) as one of the components for biofuel and methods for its production and formulation.

BACKGROUND OF THE INVENTION

Biofuel is a broad term covering any biomass related product being used for fuel applications. The origin of the biomass can be from plant, or animal source. The biodiesel is a form of biofuel and it is blended with diesel. In general, the term biodiesel is in concurrent with biofuel and anywhere biodiesel implies the blend of biomass with diesel, petrol or any petroleum product. It is thus distinguished from the straight vegetable oils (SVO) or waste vegetable oils (WVO) used as fuels in some modified diesel vehicles.

Biodiesel reduces emissions of carbon monoxide (CO) by approximately 50% and by 78% on a net lifecycle basis because the carbon in biodiesel emissions is recycled from carbon that was in the atmosphere, rather than the carbon introduced from petroleum that was sequestered in the earth's crust.

- Biodiesel contains fewer aromatic hydrocarbons: benzofluoranthene: 56% reduction; Benzopyrenes: 71% reduction.
- Biodiesel can reduce by as much as 20% the direct (tailpipe) emission of particulates, small particles of solid combustion products, on vehicles with particulate filters, compared with low-sulfur (<50 ppm) diesel. Particulate emissions are reduced by around 50%, compared with fossil-sourced diesel.
- Biodiesel has a higher cetane rating than petrodiesel, which can improve performance and clean up emissions compared to crude petrodiesel (with cetane lower than 40).
- Biodiesel is biodegradable and non-toxic—the U.S. Department of Energy confirms that biodiesel is less toxic than table salt and biodegrades as quickly as sugar.
- The flash point of biodiesel (>150° C.) is significantly higher than that of petroleum diesel (64° C.) or gasoline (−45° C.). The gel point of biodiesel varies depending on the proportion of different types of esters contained. However, most biodiesel, including that made from soybean oil, has a somewhat higher gel and cloud point than petroleum diesel. In practice, this often requires heating of storage tanks, especially in cooler climates.
- Pure biodiesel (B 100) can be used in any petroleum diesel engine, though it is more commonly used in lower concentrations. Some areas have mandated ultra-low sulfur petrodiesel, which reduces the natural viscosity and lubricity of the fuel due to the removal of sulfur and certain other materials. Additives are required to make ULSD properly flow in engines, making biodiesel one popular alternative. Ranges as low as 2% (B2) have been shown to restore lubricity. Many municipalities have started using 5% biodiesel (B5) in snow-removal equipment and other systems. Same way, diesel containing 20% of biomaterial can be named B20, 10% will be B10 etc. This notation is convenient to identify the approximate percentage of biomaterial in fuels.

Drawbacks of Biodiesel

Limited availability: There is ongoing research into finding more suitable crops and improving oil yield. Using the current yields, vast amounts of land and fresh water would be needed to produce enough oil to completely replace fossil fuel usage. It would require twice the land area of the US to be devoted to soybean production, or two-thirds to be devoted to rapeseed production, to meet current US heating and transportation needs. Global biodiesel production reached 3.8 million tons in 2005. On the other hand, the estimated transportation fuel and home heating oil used in the United States is about 230 billion US gallons. There is a need for a biomaterial which is abundant in nature, which is preferably non-edible or a product of a plant wherein some part of it is edible (like fruit, leaves) and some of it is non-edible (stem, seeds). The major drawback or using corn or soybean kinds of plant products is that they are food materials and with severe shortage of food in the world, it is not justified to use these materials for biofuel production. Ideally there is a need for biofuel source where the biomaterial usage actually creates more food material for the world rather than consuming it.

Gelling: The temperature at which pure (B100) biodiesel starts to gel varies significantly and depends upon the mixture of esters and therefore the feedstock oil used to produce the biodiesel. For example, biodiesel produced from low erucic acid varieties of canola seed (RME) starts to gel at approximately −10° C. Biodiesel produced from tallow tends to gel at around +16° C. As of 2006, there are a very limited number of products that will significantly lower the gel point of straight biodiesel. We need a biofuel which does not contain any esters when mixed with diesel for biodiesel formulation to prevent gelling at low temperatures. Ideally, we need a plant material which gels at below −10° C. and when mixed with petroleum products, the overall biofuel's gelling temperature drops below −15° C.

Contamination with water: Biodiesel may contain small but problematic quantities of water. Although it is hydrophobic (non-miscible with water molecules), it is said to be, at the same time, hygroscopic to the point of attracting water molecules from atmospheric moisture; in addition, there may be water that is residual to processing or resulting from storage tank condensation. The presence of water is a problem because it reduces the heat of combustion of the bulk fuel. This means more smoke, harder starting, less power. Water causes corrosion of vital fuel system components: fuel pumps, injector pumps, fuel lines, etc. It freezes to form ice crystals near 0° C. (32° F.). These crystals provide sites for nucleation and accelerate the gelling of the residual fuel. Water accelerates the growth of microbe colonies, which can plug up a fuel system. Biodiesel users who have heated fuel tanks therefore face a year-round microbe problem. We need a biofuel that contains less water to prevent above stated problems, preferably which does not involve transesterification procedure involving alcohols, which are the main source of water content in biofuels. We need a bio product which is preferably distilled at high temperatures under vacuum, has comparable carbon content of diesel and does not involve any chemical processing like transesterification.

Transesterification of used oil to convert to biodiesel: separation from glycerol: The process of converting vegetable oil into biodiesel fuel is called transesterification. Chemically, transesterification means taking a triglyceride molecule or a complex fatty acid, neutralizing the free fatty acids, removing the glycerin, and creating an alcohol ester. This is accomplished by mixing methanol with sodium hydroxide to make sodium methoxide. This dangerous liquid is then mixed into vegetable oil. The entire mixture then settles. Glycerin is left on the bottom and methyl esters, or biodiesel, are left on top and the methyl esters are washed and filtered. The resulting biodiesel fuel when used directly in a Diesel engine will burn up to 75% cleaner than petroleum D2 fuel. The problem with glycerol presence is it is very hydrophilic and can form hydrogen bond with water and invariably increases the moisture content in biofuel. So we need a biofuel which does not contain any glycerol or its derivatives in its composition. It is strongly preferred to a biosource without involving any transesterification.

Decrease in Mileage: When the biofuels are used in diesel engines, they tend to decrease the mileage or fuel efficiency of that engine by 10-30%. This is serious disadvantage because, whatever cost effectiveness, less pollution we are obtaining by switching to biofuels is not worth the effort due to less mileage, which eventually balance for the pollution and cost of petroleum products. We need a biosource which has comparable or higher calorific value compared to petroleum products, which gives a comparable or improved mileage when compared to diesel.

Wear and tear on engine: When biofuels are used, it is often that engine wear and tear is increased and the engine tends to make more noise and needs frequent repairs. We need a biosource which does not cause frequent engine problems and which decreases engine noise and helps in smooth running of the engine.

Hence, there is a need for finding alternative biodiesel sources which retain the benefits of biodiesel and eliminate or, at least, reduce the potential drawbacks discussed above.

An ideal biofuel should have following characteristics, 1) It needs to be from a renewable source, which improves food production rather depleting it; 2) Which does not contain any ester products and does not form gel or clouding at above −10° C.; 3) Does not involve any process like transesterification which brings more water into the biofuel; 4) does not contain glycerol; 5) does not cause significant decrease in fuel efficiency when compared to petroleum products and preferably produces comparable or improved fuel efficiency; and 6) decreases wear and tear on engine and produces less noise.

In this invention, we describe distilled technical cashew nut shell liquid (DT-CNSL) as an alternative biosource that has distinct advantages over other vegetable oils, which can be converted into biodiesel without involving the transesterification process.

CNSL Industrial Applications

CNSL derivatives, resins and polymers have a number of applications. CNSL-aldehyde condensation products and CNSL-based phenolic resins are used in applications such as surface coatings, adhesives, varnishes and paints. Various polyamines synthesized from CNSL or cardanol are used as curing agents for epoxy resins.

CNSL and its derivatives have been used as antioxidants, plasticisers and processing aids for rubber compounds and modifiers for plastic materials. Resins based on the reaction products of cardanol, phenol and formaldehyde are used to improve the resistance of rubber articles to cracking and ozone. CNSL, cardanol and cardol are all used to provide oxidative resistance to sulfur-cured natural rubber products.

A number of products based on CNSL are used as antioxidants, stabilizers and demulsifiers for petroleum products. Metal xanthates of partially hydrogenated, sulfurized cardanol is used to lower the pour point of lubricating oils as well as acting as antioxidant and anticorrosive properties. Soluble metal derivatives of CNSL are used to improve the resistance to oxidation and sludge formation of lubricating oils. Oxidized CNSL and its derivatives are used as demulsifying agents for water in oil type petroleum emulsions.

PRIOR ART

U.S. Pat. No. 6,797,021 disclose the use of a mannich base, a condensation product of hydrogenated and distilled cashew nut shell liquid in combination with aldehyde and amines for providing improved detergency to liquid hydrocarbon combustion fuel. The fuel composition comprises liquid hydrocarbon combustion fuel, a mannich base, at least one amine and aldehyde.

US2005/0160661 provides a fuel additive composition comprising cashew nut shell liquid derivative(s) or mixtures thereof and an organic solvent for stabilizing blends of ethanol and a hydrocarbon.

U.S. Pat. No. 6,339,052 discloses a lubricating oil composition for gasoline and diesel comprising sulfurized, over based calcium phenate detergent derived from distilled, hydrogenated CNSL and an amine salt of phosphorodithioic acid derived from CNSL.

P. Das et al, Biomass and Bioenergy, 27 (2004), 265-275 discloses the characteristics of pyrolysed oils derived from cashew nut shell liquid. The oils contain a mixture of cardanol, di-n-octyl phthalate, bis(2-ethyl hexyl) phthalate, cardol, di-n-decyl phthalate. The oil fractions obtained by pyrolysis are found to be miscible with diesel. Pyrolysed oils are obtained by pyrolysis where the organic materials are decomposed by heating in absence of oxygen or any other reagents.

OBJECTS OF THE INVENTION

An object of the present invention is to provide an improved biofuel composition.

STATEMENT OF THE INVENTION

Accordingly, the present invention relates to a biofuel composition comprising distilled technical cashew nut shell liquid (DT-CNSL) at a concentration ranging between 0.1-30% v/v and at least one petroleum product selected from a group comprising diesel and kerosene at a concentration ranging between 70-99.9% v/v optionally along with plant oils and fuel additive(s); A process for preparation of biofuel composition comprising distilled technical cashew nut shell liquid (DT-CNSL) at a concentration ranging between 0.1-30% v/v and at least one petroleum product selected from a group comprising diesel and kerosene, at a concentration ranging between 70-99.9% v/v optionally along with plant oils and fuel additive(s), said process comprises mixing said DT-CNSL with at least one petroleum product selected from a group comprising diesel and kerosene optionally along with plant oils and fuel additive(s) and a method of fueling biofuel composition comprising distilled technical cashew nut shell liquid (DT-CNSL) at a concentration ranging between 0.1-30% v/v and at least one petroleum product selected from a group comprising diesel and kerosene, at a concentration ranging between 70-99.9% v/v optionally along with plant oils and fuel additive(s), said method comprising fueling the biofuel composition for fueling applications.

DETAILED DESCRIPTION OF THE INVENTION

The present invention relates to a biofuel composition comprising distilled technical cashew nut shell liquid (DT-CNSL) at a concentration ranging between 0.1-30% v/v and at least one petroleum product selected from a group comprising diesel and kerosene at a concentration ranging between 70-99.9% v/v optionally along with plant oils and fuel additive(s).

In another embodiment of the present invention, the DT-CNSL comprises cardanol at a concentration ranging between 75-99.98% v/v along with cardol and methyl cardol each ranging at a concentration between 0.01-12.5% v/v.

In still another embodiment of the present invention, the diesel and the kerosene are present in ratio ranging from 9.5:0.5 v/v to 0.5:9.5 v/v.

In still another embodiment of the present invention, the fuel additive(s) is selected from a group comprising anti-polymerizing agents, anti-knocking agents anti-freezing agents, anti-coagulation agents, anti-precipitation agents, cetane index boosters and cetane number boosters or any combinations thereof.

In still another embodiment of the present invention, the fuel additive(s) is present at a concentration ranging between 0.01-5% v/v, preferably between 0.01-1% v/v.

In still another embodiment of the present invention, the fuel additive is anti-polymerizing agent.

In still another embodiment of the present invention, the anti-polymerizing agent is selected from a group comprising triphenyl phosphite (TPP), trinonyl phenyl phosphite (TNPP), diisodecyl phenyl phosphite (DDPP), diphenyl isooctyl phosphite (DPOP), diphenyl isodecyl phosphite (DPDP), tricresyl phosphate (TCP), cresyl diphenyl phosphate (CDP), dinitrophenol, hydroquinone, p-cresol, dinitro-p-cresol, hydroquinone methyl ester, polyhydroquinone and poly-$\alpha$-naphthol or any combinations thereof.

In still another embodiment of the present invention, the plant oils are selected from a group comprising rapeseed oil, palm oil, castor oil, sunflower oil, safflower oil, hemp oil, mustard oil, soybean oil, jatropha oil, radish oil, canola oil, corn oil, rice bran oil, peanut oil, cottonseed oil, coconut oil, neem seed oil and tung oil or any combinations thereof.

In still another embodiment of the present invention, the plant oils are present at a concentration ranging between 4-29% v/v.

In still another embodiment of the present invention, the plant oils are used as their methyl esters.

In still another embodiment of the present invention, the biofuel composition comprises distilled technical cashew nut shell liquid (DT-CNSL) at a concentration of about 4.5% v/v and diesel at a concentration of about 95.5% v/v optionally along with plant oils and fuel additive(s).

In still another embodiment of the present invention, the biofuel composition comprises distilled technical cashew nut shell liquid (DT-CNSL) at a concentration of about 5% v/v and diesel at a concentration of about 95% v/v optionally along with plant oils and fuel additive(s).

In still another embodiment of the present invention, the biofuel composition comprises distilled technical cashew nut shell liquid (DT-CNSL) at a concentration of about 10% v/v and diesel at a concentration of about 90% v/v optionally along with plant oils and fuel additive(s).

In still another embodiment of the present invention, the biofuel composition comprises distilled technical cashew nut shell liquid (DT-CNSL) at a concentration of about 15% v/v and diesel at a concentration of about 85% v/v optionally along with plant oils and fuel additive(s).

In still another embodiment of the present invention, the biofuel composition comprises distilled technical cashew nut shell liquid (DT-CNSL) at a concentration of about 20% v/v and diesel at a concentration of about 80% v/v optionally along with plant oils and fuel additive(s).

In still another embodiment of the present invention, the biofuel composition comprises distilled technical cashew nut shell liquid (DT-CNSL) at a concentration of about 5% v/v and kerosene at a concentration of about 95% v/v optionally along with plant oils and fuel additive(s).

In still another embodiment of the present invention, the biofuel composition comprises distilled technical cashew nut shell liquid (DT-CNSL) at a concentration of about 10% v/v and kerosene at a concentration of about 90% v/v optionally along with plant oils and fuel additive(s).

In still another embodiment of the present invention, the biofuel composition comprises distilled technical cashew nut shell liquid (DT-CNSL) at a concentration of about 15% v/v and kerosene at a concentration of about 85% v/v optionally along with plant oils and fuel additive(s).

In still another embodiment of the present invention, the biofuel composition comprises distilled technical cashew nut shell liquid (DT-CNSL) at a concentration of 5% v/v, diesel at a concentration of 90% v/v and kerosene at a concentration of 5% v/v optionally along with plant oils and fuel additive(s).

In still another embodiment of the present invention, the biofuel composition comprises distilled technical cashew nut shell liquid (DT-CNSL) at a concentration of about 5% v/v, diesel at a concentration of about 5% v/v and kerosene at a concentration of about 90% v/v optionally along with plant oils and fuel additive(s).

In still another embodiment of the present invention, the biofuel composition comprises distilled technical cashew nut shell liquid (DT-CNSL) at a concentration of about 10% v/v, diesel at a concentration of about 5% v/v and kerosene at a concentration of about 85% v/v optionally along with plant oils and fuel additive(s).

In still another embodiment of the present invention, the DT-CNSL comprises polymeric material at a concentration less than 5% v/v.

The present invention also relates to a process for preparation of biofuel composition comprising distilled technical cashew nut shell liquid (DT-CNSL) at a concentration ranging between 0.1-30% v/v and at least one petroleum product selected from a group comprising diesel and kerosene, at a concentration ranging between 70-99.9% v/v optionally along with plant oils and fuel additive(s), said process comprises mixing said DT-CNSL with at least one petroleum product selected from a group comprising diesel and kerosene optionally along with plant oils and fuel additive(s).

In still another embodiment of the present invention, the DT-CNSL is obtained by subjecting technical CNSL to distillation.

In still another embodiment of the present invention, the technical CNSL is distilled under reduced pressure ranging between 0.01-5 mm Hg and temperature ranging between 175° C.-325° C. or at atmospheric pressure at 260-450° C. temperature.

In still another embodiment of the present invention, the biofuel composition is further stored in a dry place at a temperature ranging between 10° C. to 55° C.

In still another embodiment of the present invention, the biofuel composition comprises distilled technical cashew nut shell liquid (DT-CNSL) at a concentration ranging between 4.5-20% v/v and diesel at a concentration ranging between 80-95.5% v/v optionally along with plant oils and fuel additive(s).

In still another embodiment of the present invention, the biofuel composition comprises distilled technical cashew nut shell liquid (DT-CNSL) at a concentration of about 4.5% v/v and diesel at a concentration of about 95.5% v/v optionally along with plant oils and fuel additive(s).

In still another embodiment of the present invention, the biofuel composition comprises distilled technical cashew nut shell liquid (DT-CNSL) at a concentration of about 10% v/v and diesel at a concentration of about 90% v/v optionally along with plant oils and fuel additive(s).

In still another embodiment of the present invention, the biofuel composition comprises distilled technical cashew nut shell liquid (DT-CNSL) at a concentration ranging between 5-15% v/v and kerosene at a concentration ranging between 85-95% v/v optionally along with plant oils and fuel additive(s).

In still another embodiment of the present invention, the biofuel composition comprises distilled technical cashew nut shell liquid (DT-CNSL) at a concentration ranging between 5-10% v/v, diesel at a concentration ranging between 5-95% v/v and kerosene at a concentration ranging between 5-90% v/v optionally along with plant oils and fuel additive(s).

The present invention also relates to a method of fueling biofuel composition comprising distilled technical cashew nut shell liquid (DT-CNSL) at a concentration ranging between 0.1-30% v/v and at least one petroleum product selected from a group comprising diesel and kerosene, at a concentration ranging between 70-99.9% v/v optionally along with plant oils and fuel additive(s), said method comprising fueling the biofuel composition for fueling applications.

In still another embodiment of the present invention, the fueling applications are selected from a group comprising space heating, lighting, cooking, running of engines in automobiles, running of motor pumps and generators.

In still another embodiment of the present invention, the biofuel composition comprises distilled technical cashew nut shell liquid (DT-CNSL) at a concentration ranging between 4.5-20% v/v and diesel at a concentration ranging between 80-95.5% v/v optionally along with plant oils and fuel additive(s).

In still another embodiment of the present invention, the biofuel composition comprises distilled technical cashew nut shell liquid (DT-CNSL) at a concentration of about 4.5% v/v and diesel at a concentration of about 95.5% v/v optionally along with plant oils and fuel additive(s).

In still another embodiment of the present invention, the biofuel composition comprises distilled technical cashew nut shell liquid (DT-CNSL) at a concentration of about 10% v/v and diesel at a concentration of about 90% v/v optionally along with plant oils and fuel additive(s).

In still another embodiment of the present invention, the biofuel composition comprises distilled technical cashew nut shell liquid (DT-CNSL) at a concentration ranging between 5-15% v/v and kerosene at a concentration ranging between 85-95% v/v optionally along with plant oils and fuel additive(s).

In still another embodiment of the present invention, the biofuel composition comprises distilled technical cashew nut shell liquid (DT-CNSL) at a concentration ranging between 5-10% v/v, diesel at a concentration ranging between 5-95% v/v and kerosene at a concentration ranging between 5-90% v/v optionally along with plant oils and fuel additive(s).

Cashew nut shell appears to be a rich source of long chain phenols. Cashew nut shell liquid (CNSL) occurs as a reddish brown viscous liquid in the soft honeycomb structure of the shell of cashew nut. The principal constituents of CNSL are anacardic acid, cardanol, cardol and minor quantities of 2-methyl cardol. All these phenolic compounds exist as a mixture of saturated, mono, di, and trienes and have a pentadecyl alkyl chain attached to the phenol ring. This rich carbon content of CNSL is behind our invention as biofuel.

Based on the mode of extraction, CNSL is classified into two types.

a. Solvent Extracted CNSL (Natural CNSL)

Natural CNSL is obtained by extraction of cashew nut shell with solvents like hexane, light petroleum (40-60° C.), diethyl ether, etc. It mainly contains anacardic acid (78%), cardol (10-15%), and minor quantities of 2-methyl cardol, cardanol, and polymeric material. Heating of this liquid at 150-200° C. under inert conditions converts most of the anacardic acid to cardanol and will have similar composition as technical CNSL.

b. Technical CNSL

Technical CNSL is extracted automatically by a so-called "hot CNSL bath process" in which raw nuts are heated at 180-190° C. whilst held on a slowly traveling conveyor belt submerged into CNSL bath. During the above process, anacardic acid present in the shells gets decarboxylated to cardanol. Technical CNSL obtained by this process contains cardanol (60-65%), cardol (10-12%), methyl cardol (1-2%) and polymeric material (20-30%). The content of polymeric material is dependent on the amount of time shells were present in CNSL bath and temperature of the CNSL bath. The polymeric material could increase as much as 60% if proper temperature and time control is not maintained during so-called "hot CNSL bath process". Upon vacuum distillation of crude technical CNSL gives about brown liquid containing mostly cardanol which is called distilled technical CNSL, hereafter referred in the patent specification as DT-CNSL. Our DT-CNSL is in such a way that it contains less than 5% v/v polymeric material after distillation, which will be used in biodiesel formulations.

Solvent extracted CNSL or technical CNSL cannot be used as biodiesel due to the presence of anacardic acid or polymeric material.

Key Advantages of Distilled Technical Cashew Nut Shell Liquid (DT-CNSL) as Biofuel Renewable source which creates food material rather than depleting it for its production: Worldwide CNSL production is presently estimated to be five lakh metric tons per annum. As cashew tree grows in tropical, deserts as well as coastal areas, the crops of cashew tree could provide employment and income to cashew growing countries. The application of DT-CNSL as biofuel will lead cultivation of cashew in mostly unused or underused lands, which could bring the production and availability of CNSL to substantially higher levels and improve the availability of cashew (which is a food product).

High flash point and no gelling at −10° C.: DT-CNSL has flash point higher than any other liquid fuel used currently. The freezing point is comparable to commercial diesel currently used in countries with cold weathers. No significant gelling when blended with any diesel formulation at above −10° C.

No transesterification, no glycerol and has minimum moisture content: The DT-CNSL has significantly low moisture levels, does not contain any glycerol and does not involve any transesterification procedure.

The present invention relates to a composition of a biofuel with distilled technical cashew nut shell liquid (DT-CNSL) as a main ingredient for use with machines currently run by petroleum products and other forms of fuels, biofuels or fuel substitutes. The composition of the biofuel comprises distilled technical cashew nut shell liquid (DT-CNSL) at a concentration ranging between 0.1-30% v/v and at least one petroleum product selected from a group comprising diesel and kerosene at a concentration ranging between 70-99.9% v/v optionally along with plant oils and fuel additive(s).

The fuel additive(s) is selected from a group comprising anti-polymerizing agents, anti-knocking agents, anti-freezing agents, anti-coagulation agents, anti-precipitation agents, cetane index boosters, and cetane number boosters or any combinations thereof.

The anti-polymerizing agent is selected from a group comprising triphenyl phosphite (TPP), trinonyl phenyl phosphite (TNPP), diisodecyl phenyl phosphite (DDPP), diphenyl isooctyl phosphite (DPOP), diphenyl isodecyl phosphite (DPDP), tricresyl phosphate (TCP), cresyl diphenyl phosphate (CDP), dinitrophenol, hydroquinone, p-cresol, dinitro-p-cresol, hydroquinone methyl ester, polyhydroquinone and poly-α-naphthol or any combinations thereof.

The plant oils are selected from a group comprising rapeseed oil, palm oil, castor oil, sunflower oil, safflower oil, hemp oil, mustard oil, soybean oil, jatropha oil, radish oil, canola oil, corn oil, rice bran oil, peanut oil, cottonseed oil, coconut oil, neem seed oil and tung oil or any combinations thereof.

In the instant invention, the term "B4.5" refers to a biofuel composition comprising 4.5% v/v DT-CNSL and 95.5% v/v of at least one petroleum product selected from a group comprising diesel and kerosene optionally along with plant oils and fuel additive(s). Similarly, "B5" contains 5% v/v DT-CNSL, "B10" contains 10% v/v DT-CNSL, "B15" contains 15% v/v DT-CNSL, "B20" contains 20% v/v of DT-CNSL and so on.

Distillation of Technical CNSL:

The procedure for distillation of technical CNSL containing mostly cardanol from crude CNSL is to distil under reduced pressure 0.01 to 5 mm Hg and temperature between 175° C.-325° C. or at atmospheric pressure at about 260-450° C. temperature. The distillation temperature is adjusted in such a way that always DT-CNSL contains less than 5% v/v of polymeric material.

The DT-CNSL of instant invention comprises cardanol at a concentration ranging between 75-99.98% v/v (with reference to the total volume of DT-CNSL) along with cardol and methyl cardol each ranging at a concentration between 0.01-12.5% v/v (with reference to volume of DT-CNSL). It may also comprise polymeric material at a concentration less than 5% v/v (with reference to volume of DT-CNSL). It is understood that since distillation removes the polymeric material from DT-CNSL, the invention also covers multiple distillations of DT-CNSL so as to further reduce the polymeric material.

The invention is further elaborated with the help of following examples. However, these examples should not be construed to limit the scope of invention.

Example 1

Distillation of Technical CNSL

One liter of technical CNSL was placed in a round bottom flask equipped with vacuum distillation setup. Three grams of boiling stones and 2 g of depolymerizing agent TNPP were added and distilled at 245-285° C. for 30 min at 1 mm Hg vacuum. The distillate was collected in a flask and volume of distillate containing DT-CNSL was measured. Yield: 729 g.

Example 2

Distillation of Technical CNSL

One liter of technical CNSL was placed in a round bottom flask equipped with vacuum distillation setup. Three grams of boiling stones and 1.2 g of the depolymerizing agent DPOP were added and distilled at 235-255° C. for 40 min at 0.1 mm Hg vacuum. The distillate was collected in a flask and volume of distillate containing DT-CNSL was measured. Yield: 716 g.

Example 3

Distillation of Technical CNSL

One liter of technical CNSL was placed in a round bottom flask equipped with vacuum distillation setup. Three grams of boiling stones and 2 g of depolymerizing agent 2,6-dinitro-p-cresol were added and distilled at 205-275° C. for 60 min at 0.2 mm Hg vacuum. The distillate was collected in a flask and volume of distillate containing DT-CNSL was measured. Yield: 662 g.

Example 4

Distillation of Technical CNSL

One liter of technical CNSL was placed in a round bottom flask equipped with vacuum distillation setup. Three grams of boiling stones and 1 g of depolymerizing agent hydroquinone was added and distilled at 200-205° C. for 35 min at 0.01 mm Hg vacuum. The distillate was collected in a flask and volume of distillate containing DT-CNSL was measured. Yield: 599 g.

Example 5

Distillation of Technical CNSL

One liter of technical CNSL was placed in a round bottom flask equipped with vacuum distillation setup. Three grams of boiling stones and 0.76 g of depolymerizing agent DPDP was added and distilled at 212-232° C. for 20 min at 0.05 mm Hg vacuum. The distillate was collected in a flask and volume of distillate containing DT-CNSL was measured. Yield: 664 g.

Example 6

Distillation of Technical CNSL

One liter of technical CNSL was placed in a round bottom flask equipped with vacuum distillation setup. Three grams of boiling stones and 2.2 g of depolymerizing agent TPP were added and distilled at 255-265° C. for 18 min at 0.3 mm Hg vacuum. The distillate was collected in a flask and volume of distillate containing DT-CNSL was measured. Yield: 719 g.

Storage of DT-CNSL:

DT-CNSL has phenolic materials namely cardanol and cardol which tend to oxidize upon exposure to air (change from yellow to brownish or dark brownish color). Prevention of oxidation of DT-CNSL is done by addition of antipolymerizing agent at an appropriate concentration.

Example 7

One hundred liters of DT-CNSL was stirred with 10 g of TNPP and stored in a dry place at less than 40° C. Samples were analyzed after 1, 2, 7, 14, 30, 90 days. No significant polymerization was observed (<0.5%).

Example 8

Forty five liters of DT-CNSL was stirred with 955 liters of commercial diesel and stored in a dry place at 50° C. Samples were analyzed after 1, 2, 7, 14, 30, 90 days. No significant polymerization was observed (<0.5%).

Example 9

Fifty liters of DT-CNSL was stirred with 950 liters of commercial diesel and stored in a dry place at 50° C. Samples were analyzed after 1, 2, 7, 14, 30, 90 days. No significant polymerization was observed (<0.5%).

Example 10

One hundred liters of DT-CNSL was stirred with nine hundred liters of commercial diesel and stored in a dry place at 45° C. Samples were analyzed after 1, 2, 7, 14, 30, 90 days. No significant polymerization was observed (<0.5%).

Example 11

One hundred and fifty liters of DT-CNSL was stirred with 850 liters of commercial diesel and 20 grams of DPDP and stored in a dry place at 5° C. Samples were analyzed after 1, 2, 7, 14, 30, 90 days. No significant polymerization was observed (<0.5%).

Example 12

Two hundred liters of DT-CNSL was stirred with 800 liters of commercial diesel and stored in a dry place at 25° C. Samples were analyzed after 1, 2, 7, 14, 30, 90 days. No significant polymerization was observed (<0.5%).

Example 13

Fifty liters of DT-CNSL was stirred with 950 liters of Kerosene and 10 milli liters of TNPP and stored in a dry place at 42° C. Samples were analyzed after 1, 2, 7, 14, 30, 90 days. No significant polymerization was observed (<0.5%).

Example 14

One hundred liters of DT-CNSL was stirred with 900 liters of Kerosene and 12 grams of DPOP and stored in a dry place at 10° C. Samples were analyzed after 1, 2, 7, 14, 30, 90 days. No significant polymerization was observed (<0.5%).

Example 15

One hundred and fifty liters of DT-CNSL was stirred with 850 liters of Kerosene and stored in a dry place at 10° C. Samples were analyzed after 1, 2, 7, 14, 30, 90 days. No significant polymerization was observed (<0.5%).

Example 16

Fifty liters of DT-CNSL was stirred with a mixture containing 50 liters of Kerosene and 900 liters of commercial diesel and stored in a dry place at 5° C. Samples were analyzed after 1, 2, 7, 14, 30, 90 days. No significant polymerization was observed (<0.5%).

Example 17

Fifty liters of DT-CNSL was stirred with a mixture containing 50 liters of commercial diesel and 900 liters of Kerosene and 11 mL of TPP and stored in a dry place at 5° C. Samples were analyzed after 1, 2, 7, 14, 30, 90 days. No significant polymerization was observed (<0.5%).

Example 18

One hundred liters of DT-CNSL was stirred with a mixture containing 50 liters of commercial diesel and 850 liters of Kerosene and 5 grams of TNPP and stored in a dry place at 20° C. Samples were analyzed after 1, 2, 7, 14, 30, 90 days. No significant polymerization was observed (<0.5%).

Example 19

Fifty liters of DT-CNSL was stirred with a mixture containing 150 liters of methyl ester of jatropha seed oil and 800 liters of commercial diesel and stored in a dry place at 30° C. Samples were analyzed after 1, 2, 7, 14, 30, 90 days. No significant polymerization was observed (<0.5%).

Example 20

One hundred liters of DT-CNSL was stirred with a mixture containing 200 liters of methyl ester of coconut oil and 700 liters of commercial diesel and stored in a dry place at 45° C. Samples were analyzed after 1, 2, 7, 14, 30, 90 days. No significant polymerization was observed (<0.5%).

Example 21

Comparison of Fuel Parameters

The fuel characteristics of biofuel composition are provided in the form of table below. The fuel characteristics of biofuel composition are compared with that of commercial diesel. The data clearly indicates that biofuel compositions fuel parameters are in close comparison with commercial diesel and can be used as biofuel.

It is found that the fuel characteristics of composition are similar to that of diesel. As such, the fuel characteristics of DT-CNSL alone are poorer. However, when combined with diesel, the biofuel formulation shows similar fuel characteristics with that of diesel.

TABLE 1

| Physico chemical characteristics Diesel: | | |
|---|---|---|
| S. No. | PARAMETERS | RESULTS |
| 1. | Appearance | Clear Liquid |
| 2. | Colour | Yellow |
| 3. | Acidity Inorganic | NIL |
| 4. | Acidity Total, mg KOH/gm | 0.05 |
| 5. | Ash, % by wt., | 0.006 |
| 6. | Carbon residue Ramsbottom on 10% residue, % by wt., | 0.19 |
| 7. | Cetane Index | 48 |
| 8. | Pour Point, C | −12 |
| 9. | Copper Strip Corrosion For 3 Hrs., at 100° C. | 1a |
| 10. | Distillation Recovery, Temp ° C. | |
| a. | at 85% | 304 |
| b. | at 95% | 330 |
| c. | Final Boiling Point, ° C. | 336 |
| d. | Residue, % by vol | <1.0 |
| 11. | Flash Point, ° C. (Abel) | 42 |
| 12 | Kinematic Viscosity at 40° C., cSt | 2.32 |
| 13. | Sediments, % by wt., | <0.05 |
| 14. | Density at 15° C., g/ml | 0.8325 |
| 15. | Total Sulphur, % by wt., | 0.21 |
| 16. | Water Content, ppm by wt., | 150 |

TABLE 2

Physico chemical characteristics of DT-CNSL

| S. No | Characteristics | Unit | Method | Reprocessed Vegetable oil | Specifications 15607:2005 |
|---|---|---|---|---|---|
| 1. | Density, 15° C. | kg/m$^3$ | ASTM D-4052 | 931.8 | 860-900 |
| 2. | Ash Content | % w/w | ASTM D-482 | 0.006 | 0.02 (max) |
| 3. | Kinematic Viscosity | cst | ASTM D-445 | | 2.5-6.0 |
| | at 40° C. | | | 28.38 | |
| | 50° C. | | | 18.26 | |
| 4. | Water Content | mg/kg | IP-386 | 1926.7 | 500 (max) |
| 5. | Acid value | mgKOH/g | ASTM D-974 | 0.97 | 0.50, max |
| 6. | Flash Point | ° C. | IP-170 | 202.0 | 120 (min) |
| 7. | Particulate matter | mg/kg | ASTM D-2276 | 17.2 | *24 (max) |
| 8. | Copper strip corrosion at 100° C. | rating | IP-154 | one | One (max) |
| 9. | Cetane Index | — | ASTM D-613 | 48.01 | 48 (min) |
| 10. | Total sulfur | mg/kg | ASTM D-5453 | 75.5 | 50.0 (max) |
| 11. | Micro carbon residue,, 100% sample | % w/w | ASTM D-4530 | 0.33 | 0.05 (max) |
| 12. | Carbon residue (Rams Bottom), 100% sample | % w/w | ASTM D-524 | 0.3 | 0.05 (max) |
| 12. | CFPP | ° C. | IP-309 | — | — |
| 13. | Fatty acid as % Oleic Acid | mg KOH/g | | — | — |
| 13. | Pour point | ° C. | IP-15 | <−27 | — |
| 14. | Methanol | % by wt. | By GC | Nil | 0.20 max |
| 15. | Ethanol | % by wt. | By GC | Nil | 0.20 max |
| 16. | Ester content | % by wt. | By GC | Nil | 96.5 min |
| 17. | Free Glycerol | % by wt. | ASTM D 6584 | Nil | 0.02 max |
| 18. | Total Glycerol | % by wt. | ASTM D 6584 | Nil | 0.25 max |
| 19. | Phosphorous | mg/kg | ICP-AES | 0.11 | 10.0 max |
| 20. | Sodium | mg/kg | ICP-AES | 4.90 | To report |
| 21. | Calcium | mg/kg | ICP-AES | 6.90 | To report |
| 22. | Magnesium | mg/kg | ICP-AES | 1.18 | To report |
| 23. | Oxidation stability, | mg/100 mL | ASTM D-5304 | 0.2 | 1.5 (max) |
| 24. | Colour ASTM-1500 | | Initial | 3.5 | — |
| 25. | Colour ASTM-1500 | | After 15 Days (Under Dark condition) | 3.5 | — |
| 26. | Colour ASTM-1500 | | After 15 Days (Exposed to light) | 3.5 | — |

ASTM: American Society for Testing Materials
IP: International Petroleum standards
GC: Gas Chromatography
ICP-AES: Inductively Coupled Plasma Atomic Emission Spectrometry
The designation ASTM D followed by a number denotes standard test method for that particular characteristic of the fuel.
For example, ASTM D 4052: Standard Test Method for Density and Relative Density of Liquids; ASTM D482: Standard Test Method for Ash from Petroleum Products.
Similarly IP followed by a number designates standard tests method for that particular characteristic of the fuel.
For example: IP-15 designates standard test method for measuring pour point.
GC and ICP-AES were standard instrument based methods. The color ASTM is ASTM-1500.

TABLE 3

Physico chemical characteristics of B10 formulation: 10% DT-CNSL, 90% commercial diesel

| S. No. | PARAMETERS | RESULTS |
|---|---|---|
| 1. | Appearance | Clear Liquid |
| 2. | Colour | Light Brown |
| 3. | Acidity Inorganic | NIL |
| 4. | Acidity Total, mg KOH/gm | 0.07 |
| 5. | Ash, % by wt., | 0.007 |
| 6. | Carbon residue Ramsbottom on 10% residue, % by wt., | 0.27 |
| 7. | Cetane Index | 49 |
| 8. | Pour Point, ° C. | −18 |
| 9. | Copper Strip Corrosion For 3 Hrs., at 100° C. | 1a |
| 10. | Distillation Recovery, Temp ° C. | |
| a. | at 85% | 348 |
| b. | at 95% | 360 |
| c. | Final Boiling Point, ° C. | 368 |
| d. | Residue, % by vol | <1.0 |
| 11. | Flash Point, ° C. (Abel) | 44 |
| 12 | Kinematic Viscosity at 40° C., cSt | 2.78 |
| 13. | Sediments, % by wt., | <0.05 |
| 14. | Density at 15° C., g/ml | 0.8425 |
| 15. | Total Sulphur, % by wt., | 0.20 |
| 16. | Water Content, ppm by wt., | 162 |

TABLE 4

Physico chemical characteristics of B20 formulation: 20% DT-CNSL, 80% commercial diesel:

| S. No. | PARAMETERS | RESULTS |
|---|---|---|
| 1. | Appearance | Clear Liquid |
| 2. | Colour | Brown |
| 3. | Acidity Inorganic | NIL |
| 4. | Acidity Total, mg KOH/gm | 0.10 |
| 5. | Ash, % by wt., | 0.009 |
| 6. | Carbon residue Ramsbottom on 10% residue, % by wt., | 0.28 |
| 7. | Cetane Index | 49 |
| 8. | Pour Point, ° C. | −18 |
| 9. | Copper Strip Corrosion For 3 Hrs., at 100° C. | 1a |
| 10. | Distillation Recovery, Temp ° C. | |
| a. | at 85% | 348 |
| b. | at 95% | 364 |
| c. | Final Boiling Point, ° C. | 374 |
| d. | Residue, % by vol | <1.0 |
| 11. | Flash Point, ° C. (Abel) | 44 |
| 12 | Kinematic Viscosity at 40° C., cSt | 3.53 |
| 13. | Sediments, % by wt., | <0.05 |
| 14. | Density at 15° C., g/ml | 0.8515 |
| 15. | Total Sulphur, % by wt., | 0.25 |
| 16. | Water Content, ppm by wt., | 172 |

TABLE 6

Distillation characteristics of diesel blended with 4.5% of DT-CNSL

| Recovery | Unit | Result AET ° C. |
|---|---|---|
| IBP | ° C. | 142.0 |
| 5 | % v/v | 173.0 |
| 10 | " | 188.0 |
| 20 | " | 214.3 |
| 30 | " | 242.3 |
| 40 | " | 265.5 |
| 50 | " | 282.3 |
| 60 | " | 297.7 |
| 70 | " | 314.5 |
| 80 | " | 332.9 |
| 90 | " | 354.2 |
| 95 | " | 367.0 |
| FBP | ° C. | 380.5 |
| *Recovery | % v/v | 99.0 |
| Residue | % v/v | 0.5 |
| Loss | % v/v | 0.5 |

AET: Atmospheric Equivalent temperature
*Limit of thermometer

TABLE 5

Physico-chemical characteristics of diesel with 4.5% of DT-CNSL

| S. No. | Characteristics | Unit | Method | Sample | Specification 1460:2005 Bharat Stage II |
|---|---|---|---|---|---|
| 1. | Density, 15° C. | kg/m$^3$ | ASTM D-4052 | 832.5 | 820-860 |
| 2. | Ash Content | % w/w | ASTM D-482 | <0.005 | 0.01 (max) |
| 3. | Kinematic Viscosity at 40° C. | cSt | ASTM D-445 | 2.93 | 2.0-5.0 |
| 4. | Acidity, inorganic | mgKOH/g | ASTM D-974 | Nil | Nil |
| 5. | Acidity total | mgKOH/g | ASTM D-974 | 0.09 | To be Report |
| 6. | Flash Point | ° C. | IP-170 | 51 | 35 (min) |
| 7. | Water Content | ppm | IP-386 | 154.7 | 500 (max) |
| 8. | Cetane index | — | IP-380 | 54.6 | 46 (min) |
| 9. | Cetane number | — | ASTM D-613 | 49.2 | 48 (min) |
| 10. | Micro carbon residue 10% bottom | % w/w | ASTM D-4530 | 0.06 | 0.30 (max) |
| 11. | CFPP (cold filter plugging point) | ° C. | IP-309 | −4 | Winter +6 (max) Summer+18 max) |
| 12. | Pour point | ° C. | IP-15 | −9 | Winter +3 (max) Summer+15 max) |
| 13. | Copper strip corrosion at 100° C. | rating | IP-154 | One | One (max) |
| 14. | Total sediments | mg/100 mL | ASTM D-1796 | 0.4 | 1.5 (max) |
| 15. | Particulate matter | mg/kg | ASTM D-2276 | 5.6 | *24 (max) |
| 16. | Sediment by Extr. | % Wt. | IP-53 | <0.05 | 0.05 (max) |
| 17. | Total sulfur | ppm | ASTM D-4249 | 372.5 | 500 (max) |
| 18. | Distillation characteristics | % v/v | ASTM D-86 | | |
| | at 350° C. | | | 88.1 | 85 (min) |
| | at 370° C. | | | 95.8 | 95 (min) |
| 19. | Lubricity corrected Wear scar diameter (wsd 1.4) at 60° C., microns | Microns | ISO 12156 | 226 | 460 (max) |

ISO: International Standards Organization

Example 22

Fuel Efficiency of Biofuel Containing DT-CNSL in Diesel Engine

Test was conducted on a Kirloskar diesel engine TV2, 10 KVA, 1500 rpm. The engine rpm was constant and fuel flow was adjusted for it. Engine was under no load condition and fuel efficiency was measured by the amount of time engine runs. Longer the time engine runs indicates better fuel performance. 500 ml of biofuel was added to the above engine and the engine was run till it stopped on its own. The results are shown in the table 7a below.

TABLE 7a

| Sample name | Engine starting time | Engine stopping time | Engine run time (min) |
|---|---|---|---|
| Diesel | 12:00 | 12:25 | 25 |
| B20 | 12:33 | 1:03 | 30 |
| B10 | 1:13 | 1:45 | 32 |
| B15 | 7:00 | 7:31 | 31 |
| B4.5 | 2.00 | 2.28 | 28 |

The results show that biofuel composition of instant invention gives better fuel efficiency compared to diesel alone in a diesel engine. Amongst biofuel compositions, B10 gave better fuel efficiency followed by B20, B15. and B4.5. These results clearly demonstrate that DT-CNSL containing biofuel improves the fuel efficiency significantly.

Example 23

Fuel Efficiency of Biofuel Containing DT-CNSL in Diesel Engine

Test was conducted on a diesel engine, 20 KVA, 2000 rpm. The engine rpm was constant and fuel flow was adjusted for it. Engine was under no load condition and fuel efficiency was measured by the amount of time engine runs. Longer the time engine runs, indicates better fuel performance. 500 ml of biofuel was added to the above engine and the engine was run till it stopped on its own. The results are shown in the table 7b below.

TABLE 7b

| Sample name | Engine starting time | Engine stopping time | Engine run time (min) |
|---|---|---|---|
| Diesel | 11:00 | 11:12 | 12 |
| B20 | 11:25 | 11:38 | 13 |
| B10 | 11:45 | 11:58 | 14 |
| B15 | 4:45 | 4:58 | 13 |
| B4.5 | 3.25 | 3.28 | 13 |

The results show that biofuel composition of instant invention gives better fuel efficiency compared to diesel alone in a diesel engine. Amongst biofuel compositions, B10 gave better fuel efficiency. These results clearly demonstrate that DT-CNSL containing biofuel improves the fuel efficiency significantly.

Example 24

Stability of Distilled Technical CNSL in Presence of Antipolymerizing Agents Usually change in color of distilled technical CNSL is an indicator of oxidation/polymerization of the sample. The ASTM 1500 scale used for measuring the color of fuel samples is used to monitor color change of distillate under normal room temperature in GI containers.

A freshly distilled technical CNSL is divided into five 100 ml samples and tested on according to ASTM 1500 scale. A color of greater than 5 on ASTM 1500 scale is considered not suitable for fuel applications.

The antipolymerizing agents tested for a period of three months are trinonyl phenyl phosphite (TNPP), triphenyl phosphite (TPP), diphenyl isodecyl phosphite (DPDP), diisodecyl phenyl phosphite (DDPP), and diphenyl isooctyl phosphite (DPOP).

DT-CNSL is found to be stable in presence of anti-polymerizing agents as shown in table 8a and 8b.

TABLE 8a

| Sample Name | Distilled technical CNSL | 0.1% TNPP in distilled technical CNSL | 0.1% TPP in distilled technical CNSL | 0.1% DPDP in distilled technical CNSL | 0.1% DDPP in distilled technical CNSL | 0.1% DPOP in distilled technical CNSL | 1% TNPP in distilled technical CNSL | 1% DDPP in distilled technical CNSL | 5% TNPP in distilled technical CNSL |
|---|---|---|---|---|---|---|---|---|---|
| 0 day | 3.5 | 3.5 | 3.5 | 3.5 | 3.5 | 3.5 | 3.5 | 3.5 | 3.5 |
| 1 day | 3.7 | 3.5 | 3.5 | 3.5 | 3.5 | 3.5 | 3.5 | 3.5 | 3.5 |
| 7 days | 4.1 | 3.5 | 3.6 | 3.6 | 3.6 | 3.5 | 3.5 | 3.5 | 3.5 |
| 15 days | 4.7 | 3.5 | 3.7 | 3.7 | 3.7 | 3.7 | 3.5 | 3.6 | 3.5 |
| 30 days | Greater than 5 | 3.7 | 3.9 | 3.8 | 3.9 | 3.8 | 3.6 | 3.7 | 3.5 |
| 90 days | Greater than 5 | 3.9 | 4.2 | 4.0 | 4.1 | 4.0 | 3.7 | 3.8 | 3.6 |

TABLE 8b

| Sample Name | Sample A | 0.1% TNPP in Sample A | 0.1% TPP in Sample A | 0.1% DPDP in Sample A | 0.1% DDPP in Sample A | 0.1% DPOP in Sample A | 1% TNPP in Sample A | 1% DDPP in Sample A | 5% TNPP in Sample A |
|---|---|---|---|---|---|---|---|---|---|
| 0 day | 2.5 | 2.5 | 2.5 | 2.5 | 2.5 | 2.5 | 2.5 | 2.5 | 2.5 |
| 1 day | 2.5 | 2.5 | 2.5 | 2.5 | 2.5 | 2.5 | 2.5 | 2.5 | 2.5 |
| 7 days | 2.7 | 2.5 | 2.6 | 2.6 | 2.6 | 2.5 | 2.5 | 2.5 | 2.5 |
| 15 days | 2.9 | 2.5 | 2.7 | 2.7 | 2.7 | 2.7 | 2.5 | 2.6 | 2.5 |

TABLE 8b-continued

| Sample Name | Sample A | 0.1% TNPP in Sample A | 0.1% TPP in Sample A | 0.1% DPDP in Sample A | 0.1% DDPP in Sample A | 0.1% DPOP in Sample A | 1% TNPP in Sample A | 1% DDPP in Sample A | 5% TNPP in Sample A |
|---|---|---|---|---|---|---|---|---|---|
| 30 days | 3.2 | 2.7 | 2.9 | 2.8 | 2.9 | 2.8 | 2.6 | 2.7 | 2.5 |
| 90 days | 4.0 | 2.9 | 3.3 | 3.1 | 3.1 | 3.1 | 2.8 | 2.9 | 2.6 |

Example 25

Effect of Antipolymerizing Agent Presence on Engine Performance

Test was conducted on a Kirloskar engine TV2, 10 KVA, 1500 rpm. The engine rpm was constant and fuel flow was adjusted for it. Engine was under no load condition and fuel efficiency was measured by the amount of time engine runs. Longer the time engine runs, indicates better fuel performance.

The results in the table 8c indicate that engine performance is not affected by small percentage of antipolymerizing agent.

TABLE 8c

| Biofuel formulation | Engine run time (min) |
|---|---|
| 80% Diesel, 20% distilled technical CNSL | 30 |
| 80% Diesel, 20% distilled technical CNSL, 0.1% DPDP | 30 |
| 80% Diesel, 20% distilled technical CNSL, 0.1% DPOP | 30 |
| 80% Diesel, 20% distilled technical CNSL, 0.1% TNPP | 30 |
| 90% Diesel, 10% distilled technical CNSL | 32 |
| 90% Diesel, 10% distilled technical CNSL, 0.2% DPDP | 32 |
| 90% Diesel, 10% distilled technical CNSL, 0.2% DPOP | 32 |
| 90% Diesel, 10% distilled technical CNSL, 0.2% TNPP | 32 |

Example 26

Field Trials of DT-CNSL Blend of Kerosene on Yamaha EBK 2800 Gen Set

Load: Partial load condition
Engine specifications: Capacity 2 Kva, Maximum output: 2400 VA, Rated output: 2100 VA, petrol start and run on kerosene
Engine testing: Engine was run till it stopped. The volume of kerosene blend was fixed at 10 liters and the time engine was run was monitored. Apart from engine running time, the sound from the engine was monitored if it is below 86 dB.

Results: It was observed that addition of distilled technical CNSL resulted in increased run time of the engine and the sound was below 86 dB, recommended by the Government of India for the 'class A' generators. The results are shown in table 9.

TABLE 9

| Fuel composition | Fuel volume (Litres) | Engine run time (hours) | Sound from engine less than 86 dB |
|---|---|---|---|
| Kerosene | 10 | 24.3 | Yes |
| 95% Kerosene + 5% distilled technical CNSL | 10 | 26 | Yes |
| 90% Kerosene + 10% distilled technical CNSL | 10 | 27 | Yes |
| 85% Kerosene + 15% distilled technical CNSL | 10 | 25.3 | Yes |

Example 27

Running a Diesel Engine with Combination of Diesel, Kerosene and DT-CNSL

Test was conducted on a Kirloskar engine TV2, 10 KVA, 1500 rpm. The engine rpm was constant and fuel flow was adjusted for it. Engine was under no load condition and fuel efficiency measured by the amount of time engine runs. Longer the time engine runs, indicates better fuel performance. 500 ml of biofuel was added to the above engine and the engine was run till it stopped on its own. The combination of diesel, kerosene and DT-CNSL showed better engine performance as compared to diesel shown in table 10a.

TABLE 10a

| Biofuel formulation | Engine run time (min) |
|---|---|
| Diesel | 25 |
| 90% diesel, 10% kerosene | 24 |
| 90% diesel, 5% kerosene, 5% distilled technical CNSL | 27 |
| 90% diesel, 10% distilled technical CNSL | 32 |

The presence of antipolymerizing agent (TNPP) is not affecting the engine performance as shown in table 10b. Antipolymerizing agent is present to prevent polymerization of DT-CNSL.

TABLE 10b

| Biofuel formulation | Engine run time (min) |
| --- | --- |
| Diesel | 25 |
| 90% diesel, 10% kerosene | 24 |
| 90% diesel, 5% kerosene, 5% distilled technical CNSL | 27 |
| 90% diesel, 10% distilled technical CNSL | 32 |

100% kerosene could not run the Kirloskar engine TV2, 10 KVA, 1500 rpm. Thus the engine stopped with the kerosene. Even the combination of kerosene and DT-CNSL could not run the engine.

Example 28

Field Trials on Yamaha EBK 2800 Gen Set with a Combination of Kerosene, Diesel and DT-CNSL Load: Partial load condition
Engine specifications: Capacity 2 Kva, Maximum output: 2400 VA, Rated output: 2100 VA, petrol start and run on kerosene
Engine testing: Engine was run till it stopped. The volume of kerosene blend was fixed at 10 liters and the time engine was run was monitored. Apart from engine running time, the sound from the engine was monitored if it is below 86 dB.
Results: It was observed that addition of distilled technical CNSL resulted in increased run time of the engine and the sound was below 86 dB, recommended by the Government of India for the 'class A' generators. The results are as shown in table 11.

TABLE 11

| Fuel composition | Fuel volume (Litres) | Engine run time (hours) | Sound from engine less than 86 dB |
| --- | --- | --- | --- |
| Kerosene | 10 | 24.3 | Yes |
| Diesel | 10 | 25 | Yes |
| 90% Kerosene + 10% diesel | 10 | 24.4 | Yes |
| 90% Kerosene + 5% diesel + 5% distilled technical CNSL | 10 | 25.3 | Yes |
| 85% Kerosene + 5% diesel + 10% distilled technical CNSL | 10 | 26.2 | Yes |

Example 29

Running a Diesel Engine with Combination of Diesel, Plant Oil and DT-CNSL

Test was conducted on a Kirloskar engine TV2, 10 KVA, 1500 rpm. The engine rpm was constant and fuel flow was adjusted for it. Engine was under no load condition and fuel efficiency was measured by the amount of time engine runs. Longer the time engine runs, indicates better fuel performance. 500 ml of fuel was added to the above engine and the engine was run till it stopped on its own. The combination of diesel, plant oil and DT-CNSL showed better engine performance when compared to diesel alone as shown in table 12.

TABLE 12

| Biofuel formulation | Engine run time (min) |
| --- | --- |
| Diesel | 25 |
| 80% diesel, 15% methyl ester of jatropa seed oil, 5% distilled technical CNSL | 26 |
| 80% diesel, 20% methyl ester of jatropa seed oil | 24 |
| 70% diesel, 20% of methyl ester of coconut oil, 10% distilled technical CNSL | 26 |
| 70% diesel, 30% of methyl ester of coconut oil | 23 |

We claim:

1. A biofuel composition comprising distilled technical cashew nut shell liquid (DT-CNSL) at a concentration ranging between 0.1-30% v/v and at least one petroleum product selected from the group consisting of diesel and kerosene at a concentration ranging between 70-99.9% v/v optionally along with plant oils and fuel additive(s).

2. The biofuel composition as claimed in claim 1, wherein the DT-CNSL comprises cardanol at a concentration ranging between 75-99.98% v/v along with cardol and methyl cardol each ranging at a concentration between 0.01-12.5% v/v.

3. The biofuel composition as claimed in claim 1, wherein the diesel and the kerosene are present in ratio ranging from 9.5:0.5 v/v to 0.5:9.5 v/v.

4. The biofuel composition as claimed in claim 1, wherein the fuel additive(s) is selected from the group consisting of anti-polymerizing agents, anti-knocking agents, anti-freezing agents, anti-coagulation agents, anti-precipitation agents, cetane index boosters and cetane number boosters or any combinations thereof.

5. The biofuel composition as claimed in claim 4, wherein the fuel additive(s) is present at a concentration ranging between 0.01-5% v/v.

6. The biofuel composition as claimed in claim 4, wherein the fuel additive is anti-polymerizing agent.

7. The biofuel composition as claimed in claim 4, wherein the anti-polymerizing agent is selected from the group consisting of triphenyl phosphite (TPP), trinonyl phenyl phosphite (TNPP), diisodecyl phenyl phosphite (DDPP), diphenyl isooctyl phosphite (DPOP), diphenyl isodecyl phosphite (DPDP), tricresyl phosphate (TCP), cresyl diphenyl phosphate (CDP), dinitrophenol, hydroquinone, p-cresol, dinitro-p-cresol, hydroquinone methyl ester, polyhydroquinone and poly-α-naphthol or any combinations thereof.

8. The biofuel composition as claimed in claim 1, wherein the plant oils are selected from the group consisting of rapeseed oil, palm oil, castor oil, sunflower oil, safflower oil, hemp oil, mustard oil, soybean oil, jatropha oil, radish oil, canola oil, corn oil, rice bran oil, peanut oil, cottonseed oil, coconut oil, neem seed oil and tung oil or any combinations thereof.

9. The biofuel composition as claimed in claim 8, wherein the plant oils are present at a concentration ranging between 4-29% v/v.

10. The biofuel composition as claimed in claim 8, wherein the plant oils are present in the form of their methyl esters.

11. The biofuel composition as claimed in claim 1, wherein the biofuel composition comprises distilled technical cashew nut shell liquid (DT-CNSL) at a concentration of about 4.5% v/v and diesel at a concentration of about 95.5% v/v optionally along with plant oils and fuel additive(s).

12. The biofuel composition as claimed in claim 1, wherein the biofuel composition comprises distilled technical cashew nut shell liquid (DT-CNSL) at a concentration of about 5% v/v and diesel at a concentration of about 95% v/v optionally along with plant oils and fuel additive(s).

13. The biofuel composition as claimed in claim 1, wherein the biofuel composition comprises distilled technical cashew nut shell liquid (DT-CNSL) at a concentration of about 10% v/v and diesel at a concentration of about 90% v/v optionally along with plant oils and fuel additive(s).

14. The biofuel composition as claimed in claim 1, wherein the biofuel composition comprises distilled technical cashew nut shell liquid (DT-CNSL) at a concentration of about 15% v/v and diesel at a concentration of about 85% v/v optionally along with plant oils and fuel additive(s).

15. The biofuel composition as claimed in claim 1, wherein the biofuel composition comprises distilled technical cashew nut shell liquid (DT-CNSL) at a concentration of about 20% v/v and diesel at a concentration of about 80% v/v optionally along with plant oils and fuel additive(s).

16. The biofuel composition as claimed in claim 1, wherein the biofuel composition comprises distilled technical cashew nut shell liquid (DT-CNSL) at a concentration of about 5% v/v and kerosene at a concentration of about 95% v/v optionally along with plant oils and fuel additive(s).

17. The biofuel composition as claimed in claim 1, wherein the biofuel composition comprises distilled technical cashew nut shell liquid (DT-CNSL) at a concentration of about 10% v/v and kerosene at a concentration of about 90% v/v optionally along with plant oils and fuel additive(s).

18. The biofuel composition as claimed in claim 1, wherein the biofuel composition comprises distilled technical cashew nut shell liquid (DT-CNSL) at a concentration of about 15% v/v and kerosene at a concentration of about 85% v/v optionally along with plant oils and fuel additive(s).

19. The biofuel composition as claimed in claim 1, wherein the biofuel composition comprises distilled technical cashew nut shell liquid (DT-CNSL) at a concentration of 5% v/v, diesel at a concentration of 90% v/v and kerosene at a concentration of 5% v/v optionally along with plant oils and fuel additive(s).

20. The biofuel composition as claimed in claim 1, wherein the biofuel composition comprises distilled technical cashew nut shell liquid (DT-CNSL) at a concentration of about 5% v/v, diesel at a concentration of about 5% v/v and kerosene at a concentration of about 90% v/v optionally along with plant oils and fuel additive(s).

21. The biofuel composition as claimed in claim 1, wherein the biofuel composition comprises distilled technical cashew nut shell liquid (DT-CNSL) at a concentration of about 10% v/v, diesel at a concentration of about 5% v/v and kerosene at a concentration of about 85% v/v optionally along with plant oils and fuel additive(s).

22. The biofuel composition as claimed in claim 1, wherein the DT-CNSL comprises polymeric material at a concentration less than 5% v/v.

23. A process for preparation of biofuel composition comprising distilled technical cashew nut shell liquid (DT-CNSL) at a concentration ranging between 0.1-30% v/v and at least one petroleum product selected from the group consisting of diesel and kerosene, at a concentration ranging between 70-99.9% v/v optionally along with plant oils and fuel additive(s), said process comprises mixing said DT-CNSL with at least one petroleum product selected from the group consisting of diesel and kerosene optionally along with plant oils and fuel additive(s).

24. The process as claimed in claim 23, wherein the DT-CNSL is obtained by subjecting technical CNSL to distillation.

25. The process as claimed in claim 24, wherein the technical CNSL is distilled under reduced pressure ranging between 1-15 mm Hg and temperature ranging between 225° C.-275° C. or at atmospheric pressure at about 360° C. temperature.

26. The process as claimed in claim 23, wherein the biofuel composition is further stored in a dry place at a temperature ranging between −10° C.-55° C.

27. The process as claimed in claim 23, wherein the biofuel composition comprises distilled technical cashew nut shell liquid (DT-CNSL) at a concentration ranging between 4.5-20% v/v and diesel at a concentration ranging between 80-95.5% v/v optionally along with plant oils and fuel additive(s).

28. The process as claimed in claim 23, wherein the biofuel composition comprises distilled technical cashew nut shell liquid (DT-CNSL) at a concentration of about 4.5% v/v and diesel at a concentration of about 95.5% v/v optionally along with plant oils and fuel additive(s).

29. The process as claimed in claim 23, wherein the biofuel composition comprises distilled technical cashew nut shell liquid (DT-CNSL) at a concentration of about 10% v/v and diesel at a concentration of about 90% v/v optionally along with plant oils and fuel additive(s).

30. The process as claimed in claim 23, wherein the biofuel composition comprises distilled technical cashew nut shell liquid (DT-CNSL) at a concentration ranging between 5-15% v/v and kerosene at a concentration ranging between 85-95% v/v optionally along with plant oils and fuel additive(s).

31. The process as claimed in claim 23, wherein the biofuel composition comprises distilled technical cashew nut shell liquid (DT-CNSL) at a concentration ranging between 5-10% v/v, diesel at a concentration ranging between 5-95% v/v and kerosene at a concentration ranging between 5-90% v/v optionally along with plant oils and fuel additive(s).

32. A method comprising: using a biofuel composition in a fueling application, the biofuel composition comprising distilled technical cashew nut shell liquid (DT-CNSL) at a concentration ranging between 0.1-30% v/v and at least one petroleum product selected from the group consisting of diesel and kerosene, at a concentration ranging between 70-99.9% v/v optionally along with plant oils and fuel additive(s).

33. The method as claimed in claim 32, wherein the fueling application is selected from the group consisting of space heating, lighting, cooking, running of engines in automobiles, running of motor pumps and running of generators.

34. The method as claimed in claim 32, wherein the biofuel composition comprises distilled technical cashew nut shell liquid (DT-CNSL) at a concentration ranging between 4.5-20% v/v and diesel at a concentration ranging between 80-95.5% v/v optionally along with plant oils and fuel additive(s).

35. The method as claimed in claim 32, wherein the biofuel composition comprises distilled technical cashew nut shell liquid (DT-CNSL) at a concentration of about 4.5% v/v and diesel at a concentration of about 95.5% v/v optionally along with plant oils and fuel additive(s).

36. The method as claimed in claim 32, wherein the biofuel composition comprises distilled technical cashew nut shell liquid (DT-CNSL) at a concentration of about 10% v/v and diesel at a concentration of about 90% v/v optionally along with plant oils and fuel additive(s).

37. The method as claimed in claim 32, wherein the biofuel composition comprises distilled technical cashew nut shell liquid (DT-CNSL) at a concentration ranging between 5-15% v/v and kerosene at a concentration ranging between 85-95% v/v optionally along with plant oils and fuel additive(s).

38. The method as claimed in claim 32, wherein the biofuel composition comprises distilled technical cashew nut shell liquid (DT-CNSL) at a concentration ranging between 5-10% v/v, diesel at a concentration ranging between 5-95% v/v and kerosene at a concentration ranging between 5-90% v/v optionally along with plant oils and fuel additive(s).

* * * * *